US007412557B2

(12) United States Patent
Di Benedetto et al.

(10) Patent No.: US 7,412,557 B2
(45) Date of Patent: Aug. 12, 2008

(54) APPARATUS AND METHOD FOR PREVENTING LOOPS IN A COMPUTER NETWORK

(75) Inventors: Marco Di Benedetto, Santa Clara, CA (US); Umesh Mahajan, Cupertino, CA (US); Silvano Gai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 269 days.

(21) Appl. No.: 11/434,471

(22) Filed: May 15, 2006

(65) Prior Publication Data

US 2006/0206656 A1    Sep. 14, 2006

Related U.S. Application Data

(63) Continuation of application No. 09/747,676, filed on Dec. 22, 2000, now Pat. No. 7,076,594.

(51) Int. Cl.
*G06F 13/00* (2006.01)
(52) U.S. Cl. .................... 710/316; 710/311; 710/317; 370/256; 370/238
(58) Field of Classification Search ............... 710/311, 710/316–317; 709/227, 238–244; 370/254, 370/256, 292, 362, 399, 412, 220–221, 238, 370/252, 408
See application file for complete search history.

(56) References Cited

U.S. PATENT DOCUMENTS

| 5,150,247 | A | 9/1992 | Sharpe et al. |
|---|---|---|---|
| 5,737,316 | A | 4/1998 | Lee |
| 5,754,941 | A | 5/1998 | Sharpe et al. |
| 6,032,194 | A | 2/2000 | Gai et al. |
| 6,188,694 | B1 | 2/2001 | Fine et al. |
| 6,202,114 | B1 | 3/2001 | Dutt et al. |
| 6,219,739 | B1 | 4/2001 | Dutt et al. |
| 6,317,434 | B1 | 11/2001 | Deng |
| 6,519,231 | B1 | 2/2003 | Ding et al. |
| 6,535,491 | B2 | 3/2003 | Gai et al. |
| 6,578,086 | B1 | 6/2003 | Regan et al. |
| 6,628,624 | B1 | 9/2003 | Mahajan et al. |
| 6,681,262 | B1 | 1/2004 | Rimmer |
| 6,697,339 | B1 | 2/2004 | Jain |
| 6,728,220 | B2* | 4/2004 | Behzadi ............... 370/254 |
| 6,944,130 | B1* | 9/2005 | Chu et al. ............. 370/238.1 |
| 6,985,449 | B2* | 1/2006 | Higashiyama ........... 370/256 |
| 6,987,740 | B1* | 1/2006 | Di Benedetto et al. ..... 370/256 |

OTHER PUBLICATIONS

Radia Perlman, "Interconnections Second Edition: Bridges, Routers, Switches, and Internetworking Protocols", Sections 3.3-3.7 pp. 58-90, Addison Wesley longman, Inc. 2000.

* cited by examiner

*Primary Examiner*—Raymond N Phan
(74) *Attorney, Agent, or Firm*—Cesari and McKenna, LLP

(57) ABSTRACT

A network device is configured in a manner to prevent connectivity loops such as one way connectivity loops. A user configures a port of the network device to have an associated state. The state indicates that the port is for communication up the spanning tree towards a root network device, or down the spanning tree away from the root network device. The spanning tree protocol is then executed and determines a role for the port. The role determined by the spanning tree protocol is compared to the user selected state, and if there is an inconsistency, for example one that would indicate a one way connectivity loop, the port is blocked.

24 Claims, 9 Drawing Sheets

STP LOGICAL TREE

CONFIGURATION MESSAGE

TOPOLOGY CHANGE NOTIFICATION MESSAGE

| STATE | ROLE |
|---|---|
| FWD | ROOT PORT |
| FWD | DESIGNATED PORT |
| BLK | BLOCKED PORT |

PORT STATE TABLE
PRIOR ART

| STATE | ROLE | UPLINKGUARD ENABLED |
|---|---|---|
| FWD | ROOT PORT | DON'T CARE |
| FWD | DESIGNATED PORT | NO |
| BLK | BLOCKED PORT | DON'T CARE |
| BLK | UPLINK GUARD ENABLED BACKUP FOR ROOT PORT | DON'T CARE |
| UPLINKGUARD INCONSISTENT = BLK | DESIGNATED | YES |

PORT STATE TABLE

FIG. 9

APPARATUS AND METHOD FOR PREVENTING LOOPS IN A COMPUTER NETWORK

RELATED APPLICATIONS

This application is a continuation of U.S. patent application Ser. No. 09/747,676 for Uplinkguard, Apparatus and Method for Preventing One Way Connectivity Loops in a Computer Network, by Marco Di Benedetto et al., which was filed on Dec. 22, 2000, now U.S. Pat. No. 7,076,594.

BACKGROUND OF THE INVENTION

1. Field of the Invention

This invention relates to networks of switches operating at layer 2 and executing the spanning tree protocol.

2. Background Information

A longstanding problem in computer network design is the problem of one way loops. A one way loop is formed when a port develops one way communication, the port fails to receive superior BPDUs, and so transitions to designated role and begins forwarding data packets. The ports on each end of the one way link may make this transition, and the port which the fault permits to send packets to the next switch then forms the loop.

The computer network is formed from layer 2 switches with redundant connections, where the redundancy is introduced in order to provide automatic switchover in the event of failure of a switch or link. The layer 2 network having redundant connections is normally prevented from having loops by use of the spanning tree protocol (STP).

The STP selects a "root layer 2 switch" as the root of a spanning tree, and establishes a single link to each switch lower in the spanning tree. One link is established between the root switch and each switch in the first lower layer. Each switch in the first lower layer has one link established to one or more switches in the second lower layer, and each switch in the second lower layer has only one link upstream to one switch in the first lower layer, etc. A logical tree is built, so that communications between a first end station and a second end station is by sending packets from the first end station up the spanning tree to a common switch, and then back down another branch of the tree until the packet reaches the end station to which it is addressed.

Redundant links are eliminated by switching redundant ports into a role known as "blocking". A port of a switch may be established in one of three roles: "root" role for communications upstream toward the root switch; "designated" role for communications to a switch in the next lower layer in the spanning tree; and, "blocking" role in order to remove the port from communications by the spanning tree protocol in order to eliminate loops in the layer 2 network.

The ports are chosen for the roles of root, designated, or blocking by exchange of STP packets referred to as Bridge Protocol Data Units (BPDU packets). The BPDU packets have an 8 byte field referred to as the "switch ID" and a field referred to as the "port ID". The BPDUs from one switch and one port are "superior" or "inferior", depending upon the switch ID field and port ID fields. The switch having the smallest switch ID is chosen as the root switch, and then the switch ID becomes the Root ID. Switches lower in the tree exchange BPDUs, and the switch having the lowest switch ID is superior, and is chosen as the active switch in the logical tree. In the event of redundant ports between a root switch and the next lower switch in the spanning tree, the port having the smallest ID is superior. The superior port is chosen to establish the link. The ports not used to establish a link are transitioned into "blocking" role.

A port is maintained in blocking role by receipt of BPDUs superior to any BPDU which the port could transmit, and the ports each have a timer. If no superior BPDU is received during a timer period, referred to as a BPDU timeout period, the port transitions into designated role. The timer and BPDU timeout period are used to transition the network to a backup switch in the event that a switch being used in the spanning tree develops a fault, and consequently does not transmit its BPDU during the BPDU timeout period. The blocked port then transitions to designated role and begins an active role in the spanning tree, and in some cases triggers a new execution of the STP algorithm.

The one way connectivity problem arises when a particular port develops a faulty receiver, or the port on the other end of a link develops a faulty transmitter. In either case, the particular port receives no packets, and in particular no superior BPDUs. The absence of superior BPDUs causes the particular port to transition into designated port role, and to begin forwarding packets received from structures internal to its switch. The switch at the other end of the link begins receiving the packets and forwarding them, and so creates a loop in the network.

Attempts to solve the one way connectivity loop problem have mainly concentrated on establishing that one way connectivity exists by attempting to detect the absence of packets travelling in one direction along the affected link. These methods are inadequate for reliably detecting one way connectivity loops. These methods are discussed by Radia Perlman in her book *Interconnections, Second Edition*, published by Addison Wesley, Copyright date 2000, all disclosures of which are incorporated herein by reference, especially at pages 74-75.

There is needed a better method for eliminating loops formed as a result of one way connectivity faults.

SUMMARY OF THE INVENTION

Ports of a switch are assigned by a person, for example a network manager, to be for communication up the spanning tree toward the root switch ("up ports"), or down the spanning tree away from the root switch ("down ports"). This assignment is made by enabling "uplinkguard" status for a desired up port, and by connecting the desired port to a switch which it is desired to place in the higher layer of the spanning tree. A port having Uplinkguard enabled is prevented, for example by software or firmware in its switch, from transitioning to a designated role. This assignment establishes a hierarchy of switches. Uplinkguard enabling a port, by preventing the port from transitioning to the designated role, has at least two consequences: preventing the port from being selected by the STP to transmit to lower switches in the spanning tree; and, preventing the port from transmitting when a one way connectivity fault develops on that port.

A port with Uplinkguard enabled may transition to root port role. Uplinkguard prevents a port having Uplinkguard enabled from transmitting data packets unless the STP runs and selects the port as the root port.

In the event that a fault develops and there is one way connectivity from a port, that port will not receive BPDU messages, and if the port is in blocked state, it will believe that it should take over and become the designated port for the external link to which it is connected. Uplinkguard prevents the port from transitioning to designated role. When the port attempts to transition into designated role, Uplinkguard forces the port to transition into blocked role. The Uplinkguard enabled port which develops one way connectivity is thereby transitioned into blocked role, and remains in this role.

Uplinkguard enabling ports which the network manager desires to connect to communicate up the spanning tree eliminates formation of loops caused by one way connectivity faults.

Other and further aspects of the present invention will become apparent during the course of the following description and by reference to the accompanying drawings.

BRIEF DESCRIPTION OF THE DRAWINGS

The invention description below refers to the accompanying drawings, of which:

FIG. 7 is a block diagram of a port state table of the PRIOR ART;

FIG. 9 is a block diagram of a port state table in accordance with the invention;

DETAILED DESCRIPTION OF AN ILLUSTRATIVE EMBODIMENT

Figure 1:
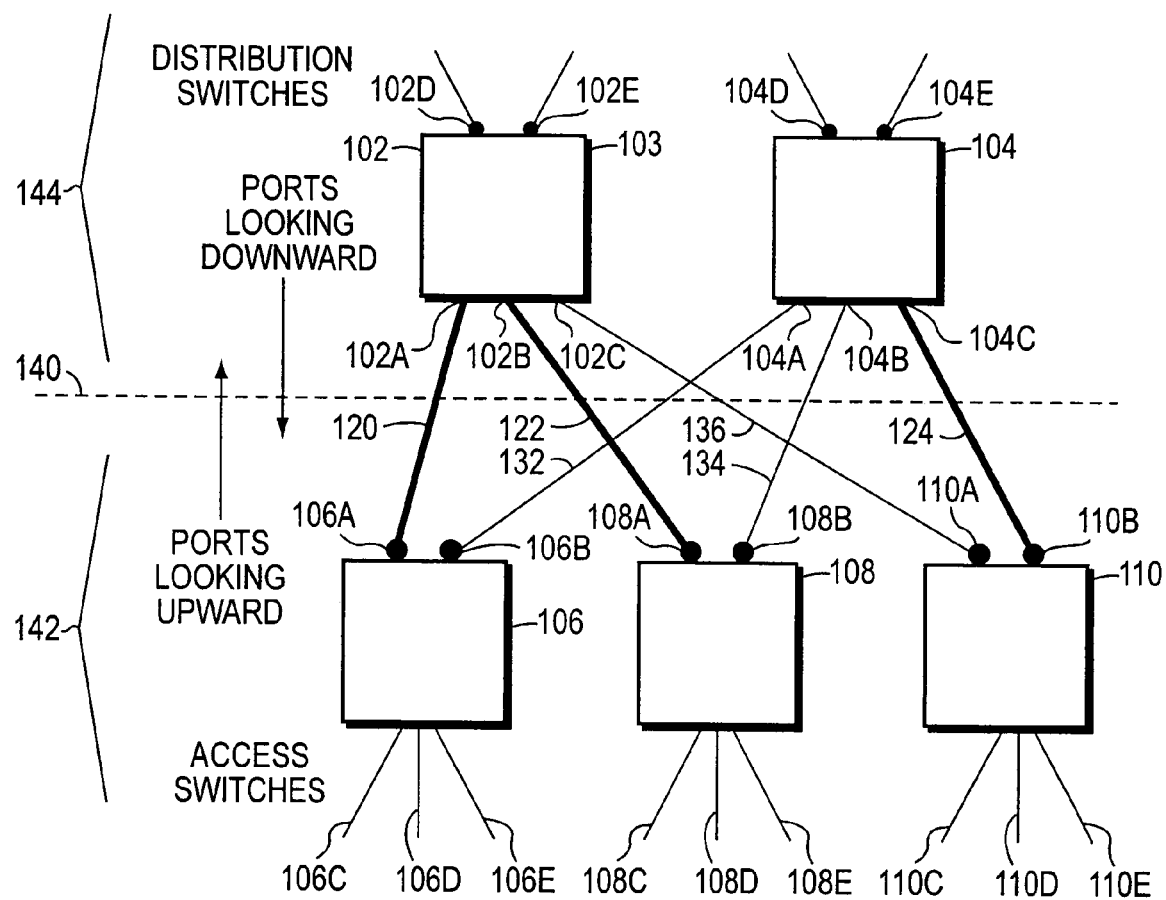
FIG. 1 is a block diagram of switches having ports Uplinkguarded in accordance with the invention.

Turning now to FIG. 1, layer 2 switches 102, 104, 106, 108, and 110 are shown. Switch 102 and switch 104 represent distribution switches. Switch 106, 108, and 110 represent access switches. The access switches are selected by a person, for example a network manager, to be lower on the spanning tree than the distribution switches.

Port 106A and port 106B have Uplinkguard enabled. Switch 108 has port 108A and port 108B with Uplinkguard enabled. Switch 110 has port 110A and port 110B Uplinkguard enabled. The Uplinkguard ports of access switches 106, 108, and 110 are each connected to distribution switches 102 and 104.

For example, Uplinkguard enabled port 106A is connected to port 102A, Uplinkguard enabled port 108A is connected to port 102B. Uplinkguard enabled port 110A is connected to port 102C.

Likewise, Uplinkguard enabled port 106B is connected to port 104A. Uplinkguard enabled port 108B is connected to port 104B. Uplinkguard enabled port 110B is connected to port 104C.

Link 120 connecting Uplinkguard enabled port 106A with port 102A is indicated by a heavy line, indicating that link 120 was selected by the spanning tree algorithm (STP).

Link 122 connecting Uplinkguard enabled port 108A with port 102B is indicated by a heavy line, indicating that link 122 was selected by the STP algorithm. Link 124 is also indicated with a heavy line, indicating that link 124 connecting Uplinkguard enabled port 110B with port 104C was also selected by the STP.

The other links, for example link 132 connecting Uplinkguard enabled port 106B with port 104A are indicated by a narrow line, to indicate that the link was not selected by the STP. Also link 134 connecting Uplinkguard enabled port 108B with port 104B is indicated by a light line, to indicate that the link was not chosen by the STP. Link 136 connecting Uplinkguard enabled port 110A with port 102C also is indicated by a light line, to indicate that link was not chosen by the STP.

Ports 106C, 106D, and 106C are representative of additional ports of switch 106, which ports connect to downstream switches or other network devices. Similarly, ports 108C, 108D, and 108C of switch 108 connect to downstream network devices, for example other network switches or end stations, etc. Further, port 110C, port 110D, and port 110E connect to other downstream network devices, for example, switches, end stations, etc.

Further, at switch 102, port 102D and port 102E are Uplinkguard enabled, and connect to network devices higher in the spanning tree. Further, with regard to switch 104, port 104D and port 104E are Uplink guarded and so connect to network devices higher in the spanning tree.

When the STP algorithm executes, the Uplinkguard enabled ports 106A, 106B, 108A, 108B, 110A, and 110B are prevented by Uplinkguard from transitioning into the designated role. However, in the event that the STP algorithm chooses one of these ports, 106A, 106B, 108A, 108B, 110A, 110B, etc., as the switch "root port", then the port transitions to the root port role. In transitioning to the root port role, the port communicates up the logical tree of the spanning tree, toward the root switch.

The dotted line 140 indicates a boundary between access switches 142 and distribution switches 144. The difference between access switches and distribution switches is that access switches are lower on the hierarchial tree. Enabling Uplinkguard on ports 106A, 106B, 108A, 108B, 110A, and 110B ensures that those ports will communicate upstream toward the root, and will not communicate downstream away from the root, because they cannot become designated ports.

Figure 2:
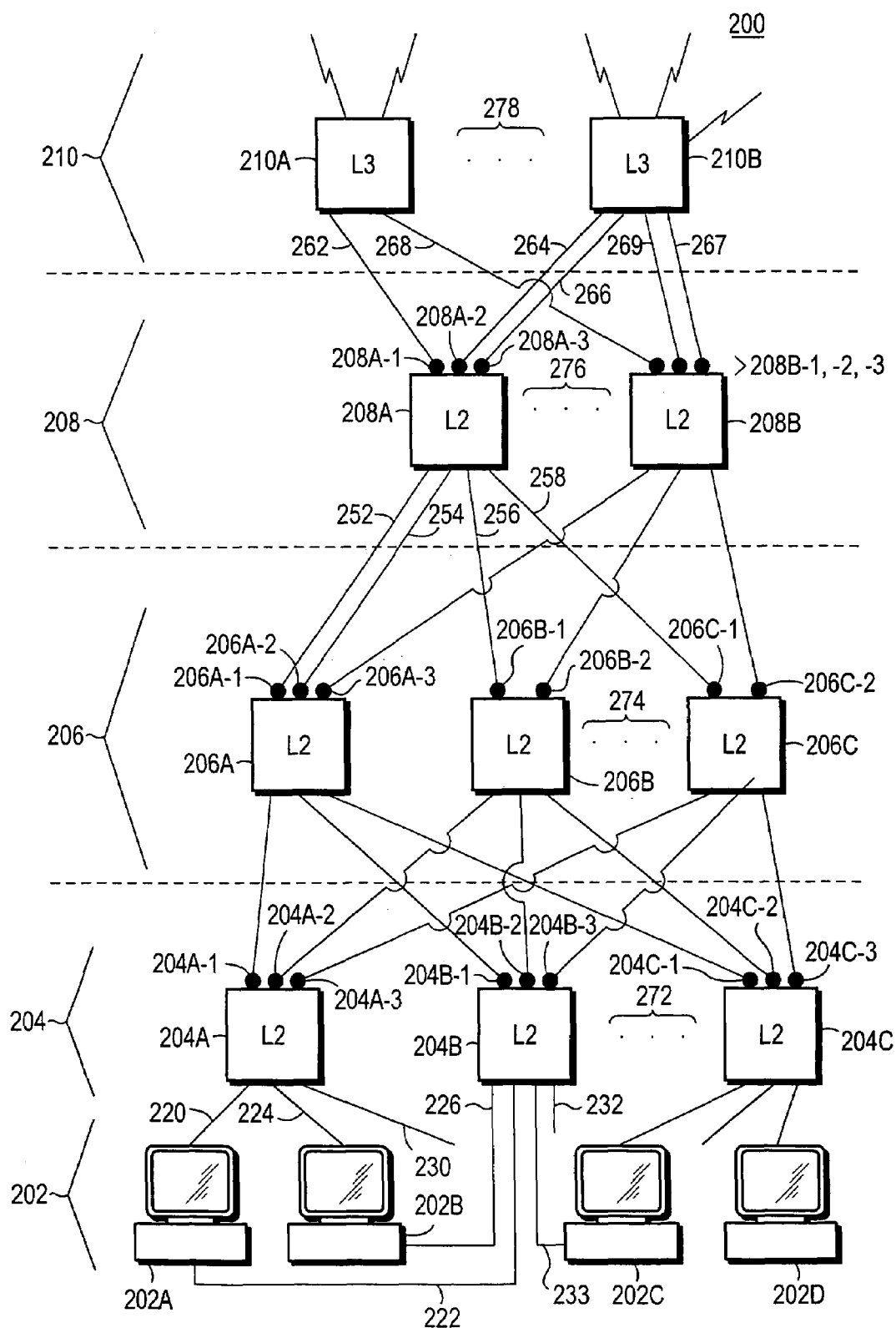
FIG. 2 is a block diagram of a network of switches connected in accordance with the invention.

Turning now to FIG. 2, there is shown a block diagram of the connections of a typical computer network used in an "enterprise computer network". An "enterprise computer network" usually refers to, for example a network: in a building; connecting buildings in a campus; connecting distant sites of a single corporation, etc. End stations 202 are at the lowest level of the logical hierarchial tree which is established by the STP protocol. Switches 204 are commonly referred to as "closet switches" and are connected directly to end stations 202. The next higher level of switches in the hierarchial tree are switches 206. Switches 206 interconnect closet switches. For example, closet switches 204 may be located on an individual floor of a building. Switches 206 may then interconnect the different floors of a building.

Switches 208 represent the next higher hierarchial layer of switches in the enterprise network, and may connect together various buildings of a campus of buildings, etc. Switches 208 then connect to layer 3 network switches 210, commonly known as routers. Routers 210 connect to external computer networks, thereby providing connectivity between the end stations 202 and a wider area network, for example the world wide Internet, etc.

For the sake of redundancy, in order to maintain connectivity in the event that a switch becomes inoperative, each network device is connected to one or more other network devices. For example, end station 202A is connected to closet switch 204A, by link 220, and end station 202A is also connected by link 222 to closet switch 204B. This redundant connection is used so that in the event that network switch 204A becomes inoperative due to a fault, that network switch 204B will continue to maintain connectivity of end station 202A to the layer 3 switches 210. Likewise, redundancy is further illustrated by end station 202B being connected by link 224 to closet switch 204A and also by link 226 to closet switch 204B. Link 230 of closet switch 204A connects to yet another end station, etc. which is not shown in FIG. 2. Further, port 232 of closet switch 204B connects to further end stations, etc. not shown in FIG. 2.

For simplicity, end station 202c and end station 202d are both shown connected to only closet switch 204c, although it is anticipated that end station 202c and end station 202d would be connected to at least one additional closet switch 204, etc.

Redundancy in network switch layer 206 is indicated by switch 206A being connected to the three shown closet switches, 204A, 204B, 204c, etc. Further, at layer 206, switch 206B is connected to the three shown closet switches 204A, 204B, and 204c. As a further illustration of the use of redundancy in the network interconnections, the network switch at layer 206, switch 206c is also connected to the three closet switches 204A, 204B, and 204c.

Again, at layer 208, network switch 208A is connected to the network switches at layer 206, that is to switch 206A by link 252, and by link 254, and switch 208A is shown connected by link 256 to layer 206 switch 206B, and by link 258 to layer 206 switch 206c. Further, redundancy is shown by layer 208 switch 208B being connected to each of the three shown layer 206 switches, 206A, 206B, and 206c.

Further redundancy is shown by the layer 208 switches being connected to the layer 3 switches 210 through redundant links. For example, switch 208A connects by link 262 to switch 210A, and by two links 264 and link 266 to layer 3 switch 210B. Further, layer 208 switch, 208B connects by link 268 to layer three switch 210A and by link 267 and by link 269 to layer 3 switch 210B.

The hierarchy of a spanning tree logical tree is established by Uplinkguard enabled on various ports, as illustrated by the Uplinkguard enabled ports being indicated by a dark circle. For example, in closet switch 204A, port 204A-1, port 204A-2, and port 204A-3 are all Uplinkguard enabled ports. Accordingly, the spanning tree protocol establishes one of the ports 204A-1, 204A-2, 204A-3 as the root port of closet switch 204A. The STP chooses the root port.

Again, the ports of switch 204B which connect toward the next higher layer in the hierarchy of switches are Uplinkguard enabled, that is ports 204B-1, port 204B-2, and port 204B-3. The STP chooses one of the ports as the root port of switch 204B, etc.

Further, the ports of closet switch 204C which are designated to connect to higher level switches in the logical tree hierarchy are ports 204C-1, 204C-2, and 204C-3, these ports are Uplinkguard enabled, and will be chosen by STP as the root port. Three dots 272 indicate that a large number of closet switches may be employed in network 200.

Again, layer 206 switches 206A, 206B, and 206C have their ports which look to higher layers in the switch hierarchy Uplinkguard enabled. For example, ports 206A-1, 206A-2, and 206A-3 are Uplinkguard enabled. Again, the STP algorithm will chose one of the ports 206A-1, 206A-2, or 206A-3 as the root port of switch 206A. Likewise, the ports of switch 206B connected to the next higher layer in the switch hierarchy, that is ports 206B-1 and 206B-2 are Uplinkguard enabled, etc.

Further, at layer 208 the ports 208A-1, 208A-2, and 208A-3 are Uplinkguard enabled. Further, the upwardly looking ports are switch 208B, ports 208B-1, 208B-2, and 208B-3 are Uplinkguard enabled.

Three dots 274 indicate that a large number of layer 206 switches may be employed in network 200. Further, three dots 276 indicate that a large number of layer 208 switches may be employed in computer network 200. Further, three dots 278 indicate that a large number of layer 210 switches, typically layer three switches or routers, may be employed in computer network 200.

Figure 3:
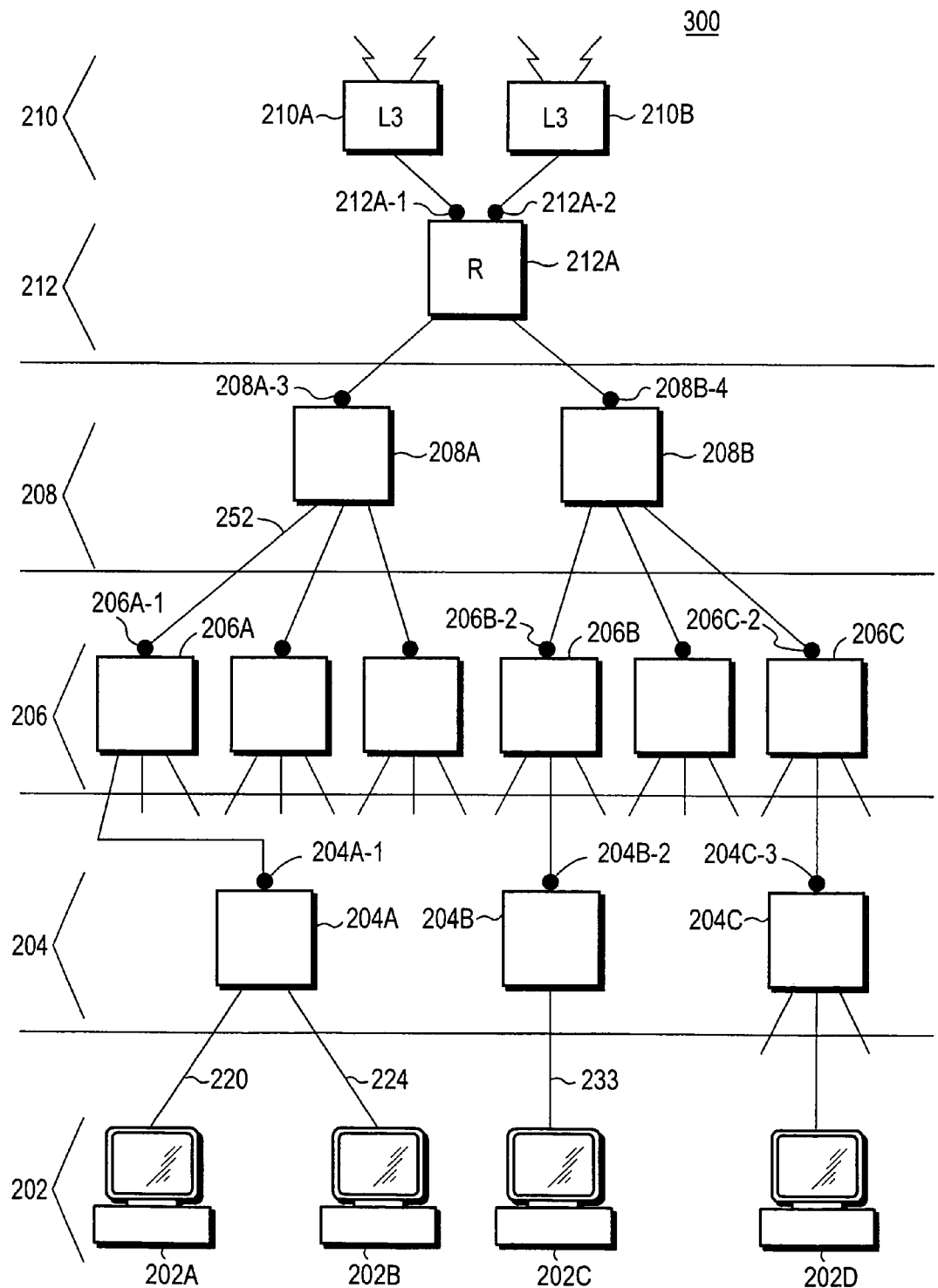
FIG. 3 is a logical spanning tree of computer switches in accordance with the invention.

Turning now to FIG. 3, the logical tree 300 created by the STP algorithm executing in computer network 200 is shown. End stations 202A, 202B, 202C, and 202D are shown. The STP logical tree 300 represents a single logical tree obtained by the STP from the complex redundant interconnections shown in FIG. 2. Further, the STP logical tree 300 illustrates that the Uplinkguard enabled ports are connected by the STP algorithm to the higher layer switches in the STP logical tree for upward communications toward the root switch 212A, as shown in FIG. 3.

For example, end station 202A is connected by link 220 to switch 204A. Switch 204A is connected by Uplinkguard enabled port 204A-1 to switch 206A. Switch 206A is connected by Uplinkguard enabled port 206A-1 through link 252 to switch 208A. The STP eliminated link 254, for example.

End station 202C connects to switch 204B. Switch 204B connects through Uplinkguard enabled port 204B-2 to switch 206B. Switch 206B connects through Uplinkguard enabled port 206B-2 to switch 208B. The STP Algorithm removed the redundant links shown in FIG. 2. Further, switch 206C connects through Uplinkguard enabled port 206C-2 to switch 208B. Switch layer 212 is not shown in FIG. 2. However, as shown in FIG. 3 switch 208A and switch 208B connect through respective Uplinkguard enabled ports to switch 212A. For example, switch 208A connects through port 208A-3 to switch 212A. Further, switch 208B connects through Uplinkguard enabled port 208B-4 to switch 212A.

Switch 212A has two, for example, ports 212A-1 and 212A-2, connected to layer 3 switches (routers) 210A, 210B. For example, Uplinkguard enabled port 212A-1 connects to layer 3 switch 210A. Further, Uplinkguard enabled port 212A-2 connects to layer three switch 210B.

In operation, a message from an end station travels up the STP logical tree 300 until it meets a common switch, and then is forwarded down by that switch along the logical links to the station to which it is addressed.

Figure 4:
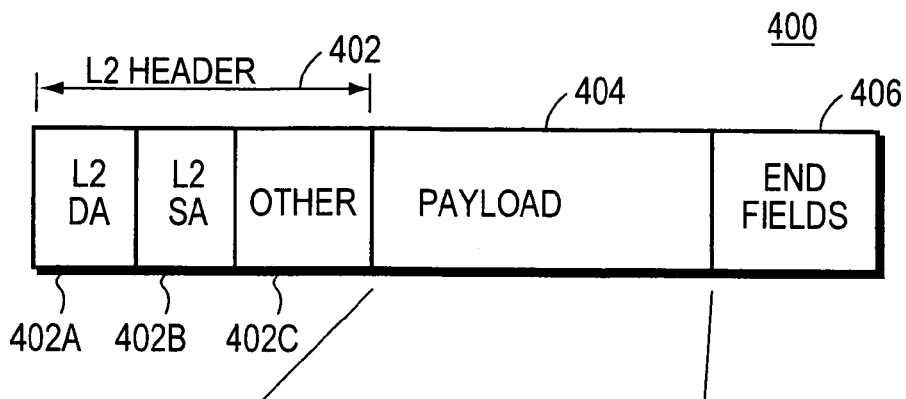
FIG. 4 is a block diagram of a typical network BPDU packet.

Operation of the spanning tree protocol will next be described. Turning now to FIG. 4, a field diagram 400 of a typical layer 2 computer network packet is shown. Computer network packet 400 has a layer 2 header 402, a layer 2 payload 404, and end fields 406. The L2 header 402 has an L2 destination address field (L2 DA field) 402 A, and L2 source address field (L2 SA field) 402 B, and fields 402 C for other layer 2 header fields, depending upon the layer 2 protocol, etc.

The following description of the spanning tree protocol follows closely the description given by Radia Pearlman in her book *Interconnections, Second Edition* , mentioned above, particularly pages 58-90. In the description by Pearlman of the spanning tree protocol, the switching entities are referred to as "bridges", and this terminology is taken as synonymous with the present terminology of layer 2 switch or "L2 switch".

Figure 5:
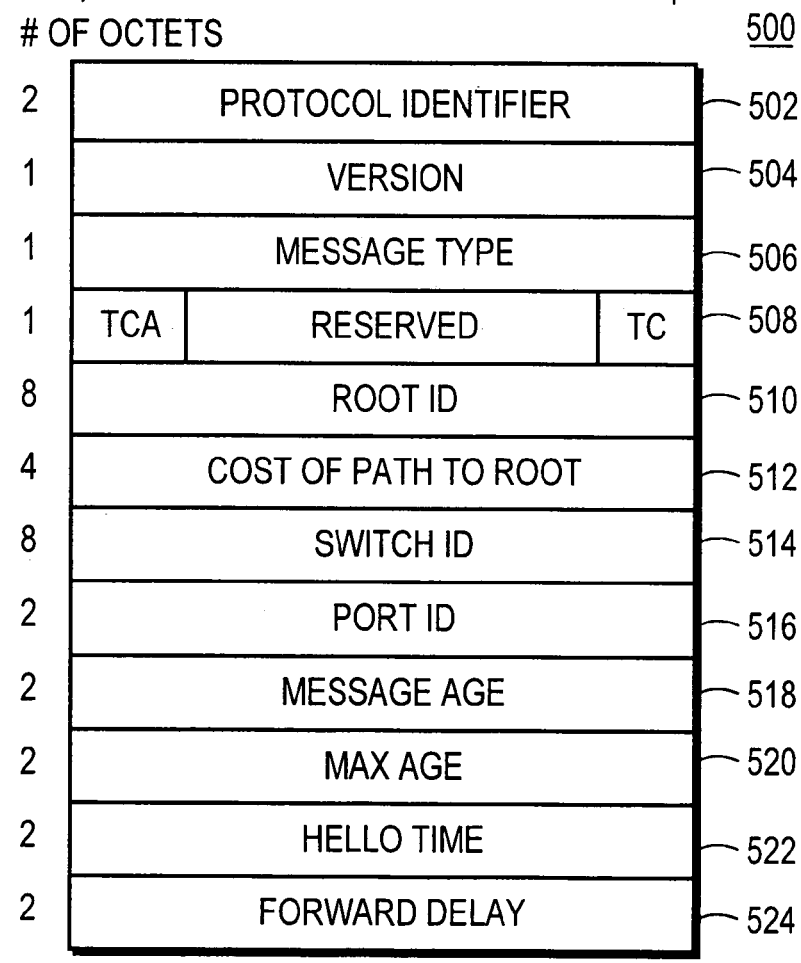
FIG. 5 is a block diagram of fields of a typical network BPDU packet.

When the computer network packet 400 is used as a configuration message for the spanning tree protocol, the payload field contains the configuration message fields shown in FIG. 5. The number of octets, or bytes, for each field are shown by the numbers at the left of the field. The protocol identifier field 502 is two bytes and has the value "0". The version field 504 is one byte, and has the value "0". The message type field 506 is one byte and has the value "0". The flags field 508 contains two (2) flags. The "TC" field is the least significant bit, and is the topology change field. If "set" in the configuration message received on the root port, it indicates that the receiving L2 change flag switch should use forward delay (a short timer) for aging out station cache entries rather than the aging timer (the normal, longer timer for station cache entries). The "TCA" field, the most significant bit, is the topology change notification acknowledgement. If "set" in the configuration message received on the root port, it indicates that the L2 switch receiving this configuration message no longer needs to inform the parent L2 switch that a topology change has occurred. The parent L2 switch will take responsibility for advising the root L2 switch of the topology change. The remaining bits in the flags field 508 are unused.

The root identification field (ID field) 510 is an important field for the present invention. The root ID field is eight (8) bytes in length. The eight bytes are made up by: Each L2 switch is configured with a two byte priority, the two byte priority is added to the six byte identification of the L2 switch. The six byte identification of the L2 switch may be a layer 2 address for one of its ports, or it may be any unique 48 bit address. The 48 bit ID is chosen to be unique for the L2 switch. The priority portion is the numerically most significant portion. The two byte priority is configured by the network administrator, a person, responsible for the L2 switch.

The cost of path to root field 512 is four (4) bytes in length. The cost of path to root is the total cost from the L2 switch that transmitted the configuration message to the L2 switch listed in the root ID field 510.

The switch ID field 514 is 8 bytes in length. This field is two bytes of configured priority followed by the six byte ID of the L2 switch transmitting the configuration message.

The port ID field 516 is two bytes in length. The first byte, that is the most significant byte, is a configurable priority. The second byte is a number assigned by the L2 switch to the port on which the configuration message was transmitted. The L2 switch must assign a locally unique number to each of its ports.

The message age field 518 is the estimated time since the root L2 switch originally transmitted its configuration message, on which the information in this configuration message is based. The estimated time is set out in units of 1/256 ths of a second.

The max age field 520 is two bytes in length. The max age field contains the time at which the configuration message should be deleted. This field is also expressed in values of 1/256 ths of a second.

The hello time field 522 is two bytes in length. The hello time is the time between generation of configuration messages by the root L2 switch. The hello time is also expressed in 1/256 ths of a second.

The forward delay field 524 is the length of time that an L2 switch should stay in each of the intermediate states before transiting a port from "blocking" to "forwarding". The forward delay time is also expressed in 1/256ths of a second.

The purpose of the spanning tree protocol is to have L2 switches dynamically discover a subset of the topology that is loop free, that is it is a logical tree, and yet has enough connectivity so that there is a path between every pair of L2 switches. That is, the tree is "spanning". The L2 switches transmit configuration messages, that is special messages, to each other that allow them to calculate a spanning tree. For example, the configuration message of FIG. 5 is such a configuration message. These configuration messages have the name, "Configuration Bridge Protocol Data Units", or BPDUs, as set out in the IEEE 802.1 standard. The terminology "configuration BPDU" and "configuration message" are synonyms.

The configuration message contains enough information so that an L2 switch can do the following:

1. Elect a single L2 switch, among all the L2 switches interconnected in the computer network to be the "root L2 switch."
2. Calculate the distance of the shortest path from themselves to the root L2 switch.
3. For each local area network in the computer network, elect a designated L2 switch from among those connected to the local area network.
4. Choose a port, known as the "root port", that gives the best path from themselves to the root L2 switch.
5. Select ports to be included in the spanning tree. The ports selected will be the root port plus any ports selected as a designated port for connection to L2 switches at a lower logical level of the spanning tree, or for connection to end station computers.
6. The Layer 2 destination address in L2 DA field 402A is a special multicast address assigned to all L2 switches. The fields and the configuration message which are key to an understanding of establishing the STP spanning tree are: the root ID field 510, which is the identification of the L2 switch assumed to be the root L2 switch; the transmitting Layer 2 switch identification, field 514, which is the identification of the L2 switch initiating this configuration message; and the cost field 512, giving the cost of the least cost path to the root L2 switch from the transmitting L2 switch. This is the best path of which the transmitting L2 switch was aware of the time of initiating transmission of the configuration message.

A L2 switch initially assumes itself to be the root L2 switch, and transmits configuration messages on each of its ports with its ID as root L2 switch, and also as transmitting L2 switch, and "0" as cost 512.

During role negotiations, a L2 switch continuously receives configuration messages on each of its ports, and saves the "best" configuration message from each port. The L2 switch determines the best configuration message by comparing not only the configuration messages received from a particular port, but also the configuration message that the L2 switch would transmit on that port.

The best configuration message is chosen as follows:

Given two (2) a configuration messages, C1 and C2, the following are true.

C1 is "better than" C2 if the root ID of field 510 listed in C1 is numerically lower than the root ID listed in C2.

1. If the root ID's are equal, than C1 is better than C2 if the cost listed in C1 is numerically lower than the cost listed in C2.
2. If the root ID's and the costs are equal, than C1 is better than C2, if the transmitting L2 switch ID listed in C1 is numerically lower than the transmitting switch ID listed in C2.
3. If the root ID's, costs, and transmitting bridge ID's are equal, then the port identifier serves as a tie breaker.

After the role negotiation, a port which is not "designated" stops sending out BPDUs, and only receives BPDUs from the designated port. Therefore, if a port is not designated, it will receive BPDUs. If the port is designated, it is not supposed to receive any BPDU, unless another switch/port tries to challenge its role, and another negotiation begins.

Figure 6:
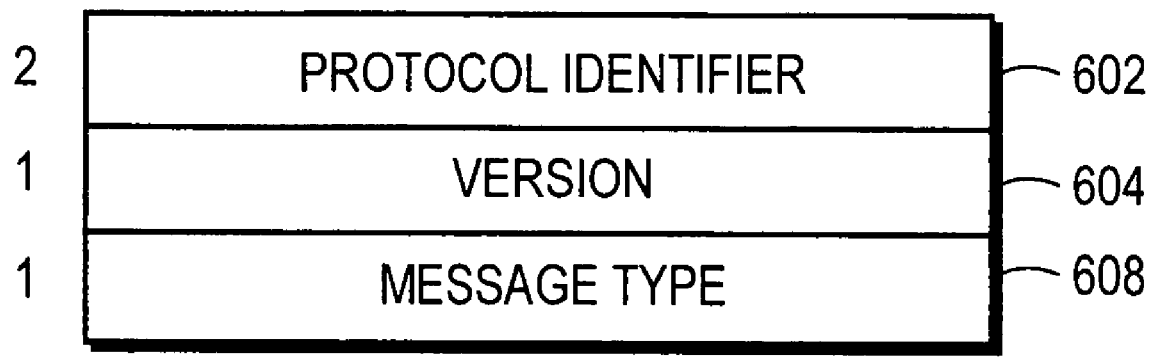
FIG. 6 is a block diagram of fields of a Topology change BPDU packet.

A topology change notification message 600, as shown in FIG. 6 is used to assist the spanning tree protocol in maintaining the spanning tree network in the event that a topology change occurs in the network. Details of the use of the topology change notification message 600 are set out by Radia Pearlman in the above-mentioned book *Interconnections Second Edition*, at pages 66-70. The topology change message uses a protocol identifier field 602, containing the value "0". The topology change notification message 600 also uses a version field 604 containing the value "0". The topology change notification message also uses a message type field 608 containing the value "128."

The topology change notification message 600 is used by a L2 switch which determines that a port must be transitioned from "forwarding" to "blocking", or vice versa The L2 switch transmits the topology change notification message upstream through its root port to its parent L2 switch. Finally, the root L2 switch receives a topology change notification message, and sets the TC flag in field 508 in its configuration messages, which it transmits on a periodic basis. Further details of the use of the topology change notification message may be found in the book by Radia Perlman, *Interconnections, Second Edition*.

Referring now to FIG. 7, table 700 is a port "state table" of the prior art. The state table is stored in memory of the switch. The state of the port is given in column 702. The role of the port is given in column 704. The role of the port is determined by the spanning tree protocol. For example, the spanning tree protocol may select the port as a root port as shown in entry 710. In the event that the port is selected as a root port, then the state of the port is set "forwarding", as shown at entry 710A. In the event that the spanning tree protocol selects the port as a designated port, as shown in entry 712, the port is set to the state "forwarding" as shown by entry 712A.

In the event that a port is set to the role "blocked port" as shown at entry 714, the state of the port is set to "blocking", as shown at entry 714A. Ports are set to "blocking" state by STP in order to avoid loops in the L2 switched network. The state of the port as set forth in table 700 is determined by the spanning tree protocol.

A port state table of the present invention is shown in FIG. 9. However, exemplary pseudo code of the present invention will be described next.

Pseudo Code

A port which is in blocking state and is Uplinkguard enabled is referred to as a "backup port" for the root port of the switch. The role of a port is determined at the time that a BPDU is received by the switch. For example, the following pseudo code may be used to determine the role of a port.

```
boolean isBackupPort(portNumber)
{
    if(portState(portNumber) == BLOCKING) {
        if(designatedBridge(portNumber) == thisBridge) {
            return FALSE;
        } else {
            return TRUE;
        }
    }
    return FALSE;
}
```

This code determines, if a port is in BLOCKING state and the superior BPDU received "does not" come from this same switch (the info is in the "designated bridge ID field" field 510 stored in the BPDU), then the port is a backup port, because it is connected to another bridge which potentially could allow the switch to reach the root.

Figure 8:
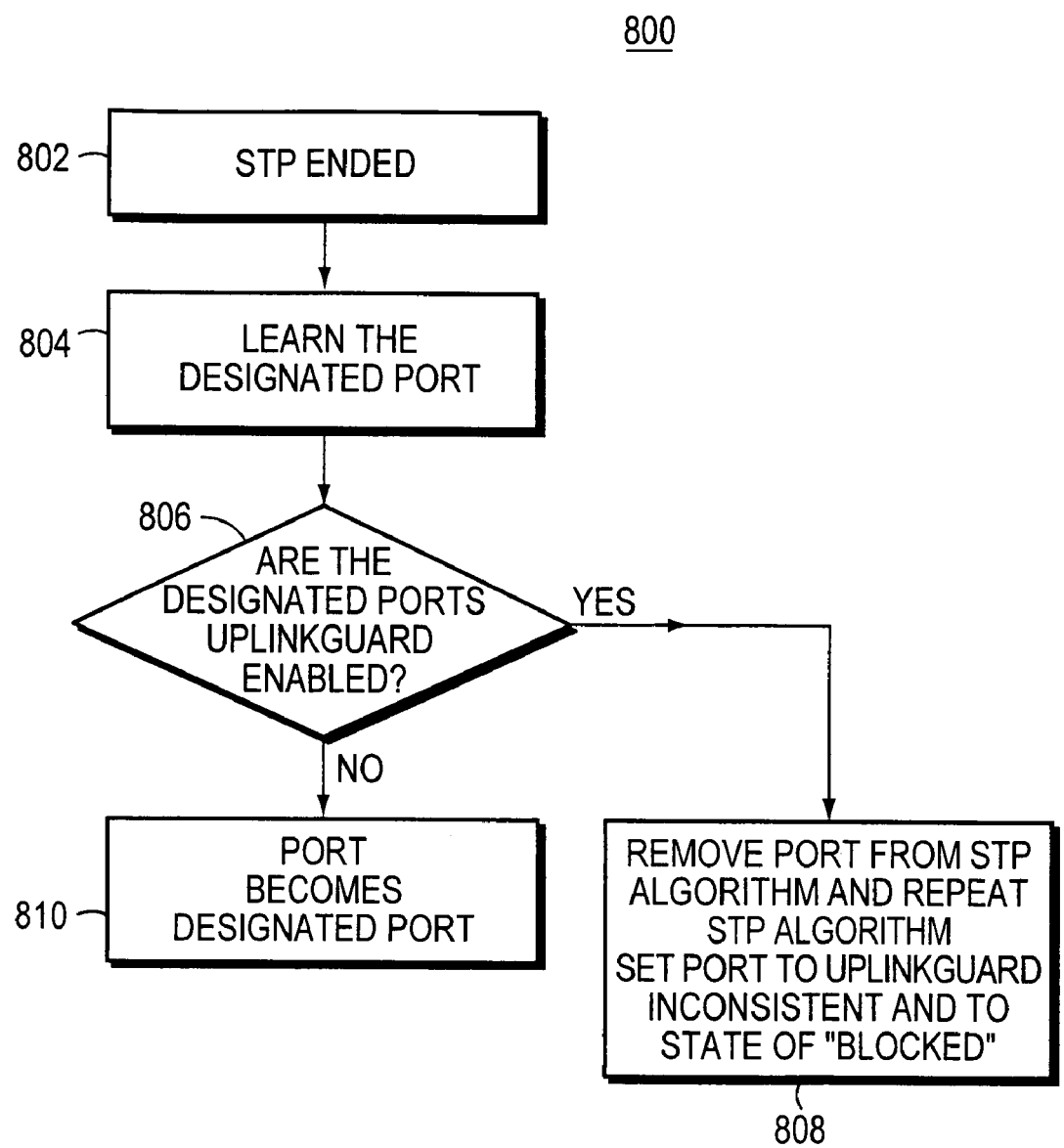
FIG. 8 is a flow chart in accordance with the invention.

Turning now to process 800 shown in the flow diagram of FIG. 8, at block 802 it is determined that an executing spanning tree protocol process has ended. Block 802 contains the notation "STP ended", meaning that a spanning tree protocol process has ended. From block 802 the process goes to block 804.

At block 804, the process 800 learns the "designated ports". A designated port is a port which communicates down the logical tree produced by the spanning tree protocol. From block 804 the process goes to block 806.

At block 806 the question: "Are the desired designated ports Uplinkguard enabled?". In the event that the answer to the question in block 806 is "Yes", the process goes to block 808.

At block 808, the port is removed from the STP algorithm and the STP algorithm is repeated. The purpose of the step in block 808 is to prevent an Uplinkguard enabled port from becoming a designated port.

In the event that the question at block 806 answers "No", the process goes to block 810. At block 810, the port becomes a designated port. The step in block 810 is executed because the STP algorithm selected the port as a designated port, and the port is not Uplinkguard enabled, and therefore is an appropriate port for communicating downstream along the logical tree of the spanning tree protocol tree.

Turning now to FIG. 9, Port State Table 900 in accordance with the present invention, is shown. The port "state" is shown in column 910. The port "role" is shown in column 912. The result of Uplinkguard being enabled is shown in column 913.

At the entry 914, a port having the state "forwarding" and the role "root port" is shown. Entry 914 at column 913 shows that the result of Uplinkguard being enabled is "Don't Care", meaning that a root port in the forwarding state is unaffected by Uplinkguard being enabled.

At entry 916, a port having the port state of forwarding, with a port role of "designated port" is shown. Entry 916 at column 913 shows that the result of Uplinkguard being enabled is "No", meaning that a designated port cannot be in forwarding state with Uplinkguard enabled.

At entry 918, a port having a state blocking is shown, along with having the port role of "blocked port". Entry 918 at column 913 shows that the result of Uplinkguard being enabled is "Don't Care", meaning that a port in blocked role and in the blocked state is unaffected by Uplinkguard being enabled.

Entry 920 gives a port having the port state of blocking, and having the port role of "Uplinkguard enabled". Entry 920 at column 913 shows that the result of a port having the role of Uplinkguard enabled and in blocked state is "Don't Care", meaning that a port having the role of Uplinkguard enabled and in blocked state is consistent with Uplinkguard being enabled.

A port represented by entry 920 is a backup port to become a root port in the event that a fault disrupts the logical tree created by the spanning tree algorithm. In the event that a fault develops, a switch will normally transmit a topology change notification message after the switch becomes aware of the topology change, a new spanning tree algorithm will execute, and a new logical tree will be built taking into account the fault.

Entry 922 gives a port having port state blocked as Uplinkguard inconsistent with the role of designated port. Entry 922 at column 913 of "Yes" indicates that a port having Uplinkguard enabled which has the role of "designated" is set to the state of "blocked" because it is inconsistent with Uplinkguard being enabled. A port represented by entry 922 has been set to Uplinkguard inconsistent at block 808 of FIG. 8.

The present invention permits a switch having a backup root port such as shown at entry 920 making a transition to use of the backup root port as the root port of the switch, in the event that the current root port fails. The transition to use of the backup root port may be done without the switch transmitting a topology change message, and so not executing the STP Algorithm.

The one way connectivity fault problem is solved by the present invention, as can be understood by reference to the flow diagram of FIG. 8, along with the Port State Table of FIG. 9. In the event that a port is in Blocked status, and the port fails to receive BPDU packets, then the port attempts to transition to Forwarding status and begin transmitting BPDUs in order to initiate execution of the STP algorithm. In the event that the port has Uplinkguard enabled, and the port attempts to transition to designated role, the port will be prevented from making this transition by Uplinkguard and will be placed permanently in Blocked status. The port is thereby prevented from forming a loop in the network, and the one way connectivity problem is solved.

Figure 10:
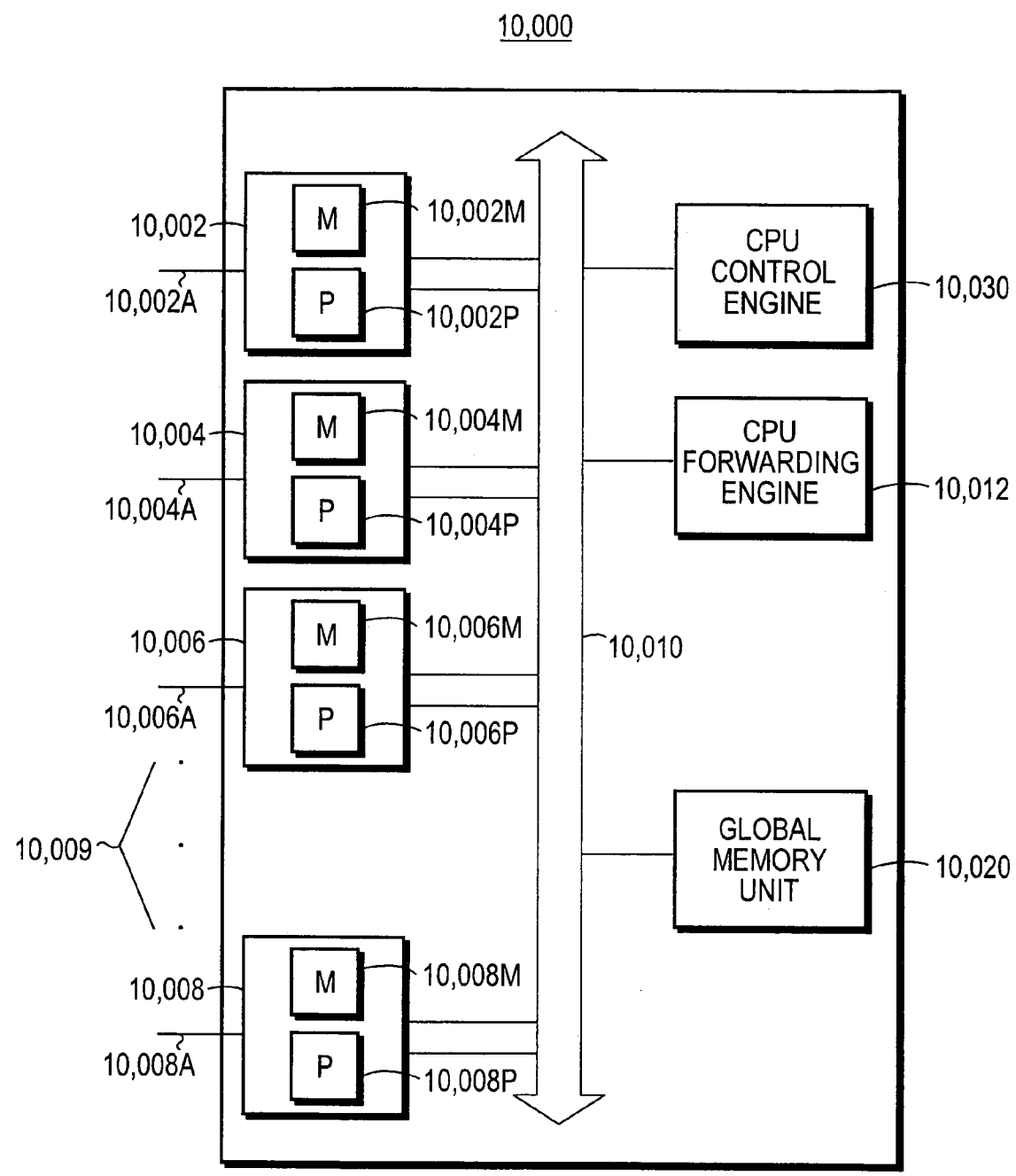
FIG. 10 is a block diagram of a layer 2 switch.

Turning now to FIG. 10, block diagram 10,000 of a representative hardware structure for internal operation of a Layer 2 switch is shown. Each linecard 10,002, 10,004, . . . 10,008 supports a port. For example, linecard 10,002 has port 10,002A; linecard 10,004 has port 10,004A; linecard 10,006 has port 10,006A, . . . and linecard 10,008 has port 10,008A, etc. Each linecard has a memory unit. For example, linecard 10,002 has memory unit 10,002M, linecard 10,004 has memory unit 10,004M, linecard 10,006 has memory unit 10,006M . . . and linecard 10,008 has memory unit 10,008M, etc. Each line card has a processor P, indicated by blocks 10,002P, 10,004P, 10,006P, . . . 10,008P, etc. The various linecards are interconnected by switch fabric 10,010. Switch fabric 10,010 may be, for example, a crossbar type switch fabric, an ATM based switch fabric, or may be simply a computer bus, etc. A central processor unit forwarding engine 10,012 also attaches to switch fabric 10,010. In operation, a packet arrives at a port of a linecard and is transferred by switch fabric 10,010 to memory units in the required linecards.

Further, CPU control engine 10,030 attaches to switch fabric 10,010. CPU control engine 10,030 is used to execute various control protocols for the network device. For example, CPU control engine 10,030 may be used to execute the Spanning Tree Protocol, the Link State Routing Protocol, the Uplinkguard protocol, the OSPF protocol, the IGRP protocol, the EIGRP protocol, etc. Execution of a process in a CPU is often referred to as "running" the process. Data read from various fields of a received packet are transferred to CPU control engine 10,030. Then CPU control engine exercises control of the network device through switch fabric 10,010, through control lines not shown in FIG. 10, etc. CPU control engine 10,030 may execute the software to implement the spanning tree protocol, and the process of the invention as illustrated in the flow chart of FIG. 8. Alternatively, the processes of the spanning tree protocol and the process of the flow chart of FIG. 8 may be executed, in whole or in part, in the processors on the linecards, processors 10,002P, through 10,008P, etc.

Processor block 10,002P, block 10,004P, block 10,006P, block 10,008P, etc. also contain blocking circuits. The blocking circuits implement the states shown in the port state table shown in FIG. 9. The port has two states: "forward" state in which the port forwards packets to or from the external link connected thereto; and "blocking" in which the port does not forward any packets. The port is transitioned between the forward state and the blocking state by software. Either the STP Algorithm software or the Uplinkguard software may transition the port between forward and blocking states.

For example, in the event that a packet is received from an external connection at port 10,002A, the packet arrives at port 10,002A, is stored in memory unit 10,002M, and is simultaneously transmitted on switch fabric 10,010 to all of the other linecards, where the packet is stored in the memory unit of each of the other linecards. The memory 10,002M in the receiving linecard is necessary as a buffer in the event that switch fabric 10,010 is busy at the time that the packet arrives at port 10,002A. Processors 10,002P, 10,004P, 10,006P, . . . 10,008P, etc. on each linecard receive information from circuits on the linecard interpreting fields of the packets as the packet is being received.

In an exemplary embodiment of the invention, processors 10,002P, 10,004P, 10,006P, . . . 10,008P, etc. on the individual linecards act as forwarding engines and make decisions concerning the ports through which the packet is to be transmitted.

In an alternative exemplary embodiment of a Layer 2 switch, as the packet is being transferred on switch fabric 10,010 to all of the other linecards, fields of the packet are interpreted by circuitry in the receiving linecard, information is transferred to CPU forwarding engine 10,012, and CPU 10,012 makes decisions concerning which ports the packet is to be transmitted out through. Once CPU 10,012 makes a decision as to which ports the packet should be forwarded through, CPU 10,012 asserts control lines (not shown in FIG. 10) which grant permission to the appropriate linecards to transmit the packet out through that linecard's port.

In an alternative embodiment of the invention, a linecard may support a plurality of ports rather than only one port as is shown in FIG. 10. Three dots 10,009 indicate that a large number of linecards may be supported by the Layer 2 switch.

The exemplary internal architecture of a typical Layer 2 switch as shown in block diagram 10,000 permits line speed transfer of an incoming packet to one or more outgoing ports, simultaneously with receipt of the packet. Only a small delay is encountered, depending upon factors, for example, the state of switch fabric 10,010 as the packet is received at its incoming port, and the delay imposed by ordinary switch fabric transfer processes along switch fabric 10,010.

In an alternative exemplary design of a Layer 2 switch, a linecard may transfer an incoming packet to global memory unit 10,020. CPU 10,012 reads fields of the packet and decides which linecards must transmit the packet. After the packet is received into global memory 10,020, the packet is read by each linecard which must transmit the packet, and then the packet is transmitted by the linecards. In either event, the hardware reads the fields of the appropriate Layer of the packet, and responds by making the appropriate forwarding decision.

It is to be understood that the above described embodiments are simply illustrative of the principles of the invention. Various other modifications and changes may be made by those skilled in the art which embody the principles of the invention and fall within the spirit and scope thereof.

What is claimed is:

1. A method for preventing the formation of loops in a computer network, the computer network organized into a spanning tree, the method comprising the steps of:

selecting by a user a state for a port of the network device, the state indicating that the port is for communication up the spanning tree towards a root network device;

executing a spanning tree protocol on the computer network, the spanning tree protocol, determining a role for the port; and comparing the state selected by the user with the role determined by the spanning tree protocol, and if the role determined by the spanning tree protocol would cause the port to communicate down the spanning tree away from the root network device, setting the port to a blocked port role.

2. The method of claim 1 wherein the step of comparing further comprises:

if the role would cause the port to communicate down the spanning tree away from the root network device, indicating the existence of a one way connectivity loop.

3. The method of claim 1 wherein the role for the port determined by the spanning tree protocol is a designated port role.

4. The method of claim 1 wherein the role for the port determined by the spanning tree protocol is a root port role and wherein the step of comparing further comprises:

if the role for the port determined by the spanning tree is the root port role, setting the port to the root port role regardless of the state selected by the user.

5. The method of claim 1 wherein the role for the port determined by the spanning tree is a blocked port role and wherein the step of comparing further comprises:

if the role for the port determined by the spanning tree is the blocked port role, setting the port to the blocked port role regardless of the state selected by the user.

6. The method of claim 1 further comprising:

subsequent to the step of comparing, reexecuting the spanning tree protocol to determine a new spanning tree that does not include the port.

7. The method of claim 3 wherein the state for the port selected by the user is an uplinkguard enabled state.

8. A network device configured to prevent the formation of loops in a computer network, the computer network organized into a spanning tree, the network device comprising:

a port for interconnection to the computer network;

a memory device associate with the port, the memory device configured to store a port state table, the port state table having a first data field to hold a role for the port, the role determined by a spanning tree protocol, the port state table having a second data field to hold a state for the port, the state selected by a user; and a processor configured to access the memory and compare the state selected by the user with the role determined by the spanning tree protocol, the processor further configured to set the port to a blocked port role if the role determined by the spanning tree protocol would cause the port to communicate down the spanning tree away from the root network device and the state selected by the user indicates the port is for communication up the spanning tree towards a root network device.

9. The network device of claim 8 wherein the port, memory device, and the processor are located on a line card of the network device, and the network device is configured to support a plurality of line cards.

10. The network device of claim 8 wherein the processor is further configured to indicate the existence of a one way connectivity loop if the role determined by the spanning tree protocol would cause the port to communicate down the spanning tree away from the root network device and the state selected by the user indicates the port is for communication up the spanning tree towards a root network device.

11. The network device of claim 8 wherein the role for the port determined by the spanning tree protocol is a designated port role.

12. The network device of claim 8 wherein the role for the port determined by the spanning tree protocol is a root port role and wherein the processor is further configured to set the port to root port role regardless of the state selected by the user if the role for the port determined by the spanning tree is the root port role.

13. The network device of claim 8 wherein the role for the port determined by the spanning tree protocol is a blocked port role and wherein the processor is further configured to set the port to blocked port role regardless of the state selected by the user if the role for the port determined by the spanning tree is the blocked port role.

14. The network device of claim 11 wherein the state for the port selected by the user is an uplinkguard enabled state.

15. A network device configured to prevent the formation of loops in a computer network, the computer network organized into a spanning tree, the network device comprising:

means for selecting a state for a port of the network device, the state indicating that the port is for communication up the spanning tree towards a root network device;

means for executing a spanning tree protocol on the computer network, the spanning tree protocol determining a role for the port;

means for comparing the state selected by the user with the role determined by the spanning tree protocol; and mean for setting the port to a blocked port role if the role for the port determined by the spanning tree protocol would cause the port to communicate down the spanning tree away from the root network device.

16. A method for preventing the formation of loops in a computer network, the computer network organized into a network topology by a link management protocol, the method comprising the steps of:

selecting by a user a state for a port of the network device, the state indicating the port is for communication up the network topology toward a root network device;

executing the link management protocol on the computer network, the link management protocol determining a role for the port; and comparing the state selected by the user with the role determined by the link management protocol, and if the role determined by the link management protocol would cause the port to communicate down the network topology away from the root network device, setting the port to a blocked port role.

17. The method of claim 16 wherein the step of comparing further comprises:

if the role would cause the port to communicate down the spanning tree away from the root network device, detecting the existence of a one way connectivity loop.

18. The method of claim 16 wherein the role for the port determined by the link management protocol is a designated port role.

19. The method of claim 18 wherein the state for the port selected by the user is an uplinkguard enabled state.

20. A network device configured to prevent the formation of loops in a computer network, the computer network organized into a spanning tree, the network device comprising:

a port for interconnection to the computer network;

a memory device associate with the port, the memory device configured to store a port state table, the port state table having a first data field to hold a role for the port, the role determined by a link management protocol, the port state table having a second data field to hold a state for the port, the state selected by a user; and a processor configured to access the memory and compare the state selected by the user with the role determined by the link management protocol, the processor further configured to set the port to a blocked port role if the role determined by link management protocol would cause the port to communicate down a network topology away from the root network device and the state selected by the user indicates the port is for communication up the network topology toward a root network device.

21. The network device of claim 20 wherein the processor is further configured to indicate the existence of a one way connectivity loop if the role determined by the link management protocol would cause the port to communicate down the network topology away from the root network device and the state selected by the user indicates the port is for communication up the network topology towards a root network device.

22. The network device of claim 20 wherein the role for the port determined by the link management protocol is a designated port role.

23. The network device of claim 22 wherein the state for the port selected by the user is an uplinkguard enabled state.

24. A computer readable medium containing executable program instructions for preventing the formation of loops in a computer network, the executable program instructions comprising program instructions configured to:

create a port state table in a memory device, the port state table having a first data field to hold a role for the port determined by a protocol and having a second data field to hold a state for the port, the state selected by a user, the state indicating the port is for communication in a direction towards a root network device; and compare the state selected by the user with the role determined by the protocol, and if the role determined by the protocol would cause the port to communicate in a direction away from the root network device, set the port to a blocked port role.

* * * * *

UNITED STATES PATENT AND TRADEMARK OFFICE
CERTIFICATE OF CORRECTION

PATENT NO.        : 7,412,557 B2                                            Page 1 of 1
APPLICATION NO.   : 11/434471
DATED             : August 12, 2008
INVENTOR(S)       : Marco Di Benedetto It is certified that error appears in the above-identified patent and that said Letters Patent is hereby corrected as shown below:

Col. 4, Line 35, replace "hierarchial" with "hierarchical"

Col. 4, Line 46, replace "hierarchial" with "hierarchical"

Col. 4, Line 49, replace "hierarchial" with "hierarchical"

Col. 4, Line 54, replace "hierarchial" with "hierarchical"

Signed and Sealed this
Fifth Day of April, 2011

David J. Kappos
*Director of the United States Patent and Trademark Office*